United States Patent [19]
Pedersen et al.

[11] Patent Number: 5,826,027
[45] Date of Patent: Oct. 20, 1998

[54] METHOD FOR SUPPORTING AN EXTENSIBLE AND DYNAMICALLY BINDABLE PROTOCOL STACK IN A DISTRUBITED PROCESS SYSTEM

[75] Inventors: Bradley J. Pedersen, Coral Springs; Werner Kurt Perry, Ft. Lauderdale, both of Fla.

[73] Assignee: Citrix Systems, Inc., Fort Lauderdale, Fla.

[21] Appl. No.: 540,891

[22] Filed: Oct. 11, 1995

[51] Int. Cl.⁶ .................................................. G06F 13/14
[52] U.S. Cl. .............................. 395/200.51; 395/200.57
[58] Field of Search ........................ 395/200.11, 200.12, 395/200.14, 200.1, 200.54, 200.55, 200.57, 200.5, 200.51, 200.52

[56] References Cited

U.S. PATENT DOCUMENTS

| | | | |
|---|---|---|---|
| 5,265,239 | 11/1993 | Ardolino | 395/500 |
| 5,517,617 | 5/1996 | Sathaye | 395/200.1 |
| 5,548,726 | 8/1996 | Pettus | 395/200.09 |
| 5,550,981 | 8/1996 | Bauer | 395/200.5 |
| 5,553,242 | 9/1996 | Russell | 395/200.12 |
| 5,557,748 | 9/1996 | Norris | 395/200.1 |
| 5,572,674 | 11/1996 | Ernst | 395/200.1 |
| 5,659,685 | 8/1997 | Williams | 395/200.5 |

OTHER PUBLICATIONS

Network Working Group Request for Comments : 1541, "Dynamic Host Configuration Protocol", R Droms, Oct. 1993.

*Primary Examiner*—Tod R. Swann
*Assistant Examiner*—Christopher S. Chow
*Attorney, Agent, or Firm*—Testa, Hurwitz & Thibeault, LLP

[57] ABSTRACT

A method for providing an extensible and dynamically bindable protocol stack with parameters in a distributed process system based on using information exchange over a common transport mechanism between an application server and a client workstation. The application server and the client workstation are initialized with a minimum set of enabled protocols, only the basic set required by the common transport mechanism. The workstation requiring service sends a list of required protocols with parameters to the application server together with any optional protocols and enables the required protocols. The server responds by enabling the required and acceptable optional protocols. The server negotiates the arrangement by an acknowledgment that includes any parameter modifications required. Both client and server enable the negotiated set of protocols.

21 Claims, 7 Drawing Sheets

METHOD FOR SUPPORTING AN EXTENSIBLE AND DYNAMICALLY BINDABLE PROTOCOL STACK IN A DISTRUBITED PROCESS SYSTEM

FIELD OF INVENTION

The invention relates to distributed process systems having an application server and a plurality of user workstations and allows a workstation to specify the protocol stack without any application server prior knowledge and to add protocols without modifying any other protocol modules.

BACKGROUND TO THE INVENTION

Distributed process systems, in which the technique of distributing an application execution is used, are similar to the traditional multi-user systems such as Unix. From a graphics standpoint, the distributed process systems are similar to X-Windows. The technique of distributing an application execution is called Distributed Application Presentation (DAP).

In a DAP system, an application server provides application execution services to network users rather than running the application at the user's workstation. When the application runs, the application server intercepts the application user's interface (e.g., the display screen, keyboard, and mouse) data and transmits/receives this data to/from a small client (user) program running at the user's workstation.

More advanced DAP systems operate in a highly integrated network environment in which an application server technology is coupled with local area network (LAN) or wide area network (WAN) transport systems as shown in FIG. 1. The host computer 300 is coupled to LAN/WAN transport system 304. This coupling, that allows the LAN/WAN network administrator to more widely distribute the services of application servers 302 to user workstations 305, requires that the host computer be able to support the simultaneous execution of multi-user applications including support of workstation interfaces such as: keyboard, mouse, and display screen. The most prevalent use of application servers is in dial-in remote access DAP systems.

When running an application on an application server, the user is not actually executing the application code on the user's local workstation. Therefore, in order to make the application server's remoteness transparent, the user workstation storage disks and printers must be accessible by the application server.

The workstation includes the following capabilities:
(1) a protocol for transmission of display screen, keyboard, mouse, file, and printer data;
(2) a layered distribution architecture for transmission of the protocol packets;
(3) a client program that can run on the user workstation for protocol interpretation; and
(4) a configuration application for configuring the application distribution protocol stack for accommodating a variety of transport media and client types. When the workstation is operating as a virtual computer, it is running a client program which transmits and receives Windows-type object level protocol packets. The workstation also handles protocol packets for controlling printing and storage disk operation. If the workstation is a fixed function system, such as an ASCII text terminal, the protocol of the terminal is used.

FIG. 2 shows the major workstation protocol layers of a commercial application server system called "WinFrame™" manufactured by Citrix Systems, Inc. of Coral Springs, Fla. The WinFrame™ workstation is called "WinStation". The present invention has been implemented in a system of this type and hence the WinFrame™ system will be used as a basis for describing the invention by way of explanation only and not by way of limitation of the scope of the invention.

Referring to FIG. 2, the three major sets of protocol layers are: the WinStation Driver (WD) set 10 acting as the workstation data stream manager that includes ICA, the protocol used for communication of screen, and mouse and keyboard updates, between the application server and the workstation; the protocol driver (PD) set 20 of optional communications protocol layers such as data compression, encryption, reliability (error control), and modem control; and transport drivers 21 for connecting the workstation to the connection (transport) medium.

ICA, a line protocol used to communicate Windows application presentation data with the application server over a low bandwidth connection, includes protocol definition for the following capabilities:
(1) full-screen text presentation,
(2) Windows application screen presentation,
(3) keyboard and mouse input,
(4) session control,
(5) framing of data for asynchronous connections,
(6) error detection and recovery,
(7) compression and encryption hooks,
(8) file system redirection,
(9) print redirection, and
(10) multiple generic virtual channels.

ICA uses packet communication techniques for communications between the application server and the workstation. The packet, shown in FIG. 3, can be prefixed by optional preambles, negotiated when a connection is established, for managing the transmission of the packet. The nature of the transmission medium (e.g., LAN or Async) and user defined options (e.g., compression, encryption) determine the total packet definition, but the overall packet format is as shown in FIG. 3. The labeled segments are defined as follows:

Frame Head—optional preamble protocol header for framing stream oriented transport data;
Reliable—optional preamble protocol header in packet for transmission error detection and correction;
Encrypt—optional preamble protocol header for managing encrypted data;
Compress—optional preamble protocol header for managing compressed data;
COMMAND—ICA command byte marking the beginning of the base ICA protocol packet;
COMMAND DATA—optional data bytes associated with the specified COMMAND segment that can include virtual channel protocol packets; and
Frame Trail—optional protocol trailer (postamble) for framing ASYNC transport data.

Only the COMMAND byte is always present in the packet. The preambles and postamble are dependent upon the transport used and the initialization negotiations.

The ICA COMMANDS include control commands and virtual channel commands.

The ICA control COMMAND packets manage the connection of the workstation to the application server and the server relationship to workstation interface. The COMMAND packets include information on:

(1) connection initialization;
(2) workstation (client) interface and display screen control;
(3) workstation keyboard and mouse input to the application server; and
(4) workstation keyboard light emitting diode (LED) display control.

The ICA virtual channel COMMAND packets provide multiplexed management of multiple virtual channels. A virtual channel is used to add functional enhancements to the client independent of the ICA protocol. The virtual channel is a session-oriented transmission connection that can be used by the application layer code. The ICA virtual channel COMMAND protocols include: Thinwire, Printer Mapping, and Drive Mapping.

Thinwire—is used to transmit presentation commands to the client workstation from Windows applications running on the application server. It is designed to use low bandwidth connections between the server and the workstation by using such techniques as:

(1) command and object specific compression;
(2) outboard complex clipping and complex curve drawing;
(3) efficient caching of Windows objects (bitmaps, brushes, glyphs, and pointers); and
(4) run-length encoding.

Printer Mapping—is a virtual channel protocol for the transmission of printer data to the client workstation.

Drive Mapping—is a virtual channel protocol for the transmission of file system functions between the application server and the client workstation.

FIG. 4 shows the Citrix Systems WinStation 100 and WinFrame™ Application Server 200 Communications Stack architecture as a set of component definitions. WinStation 100 is a system component capable of displaying application data and transmitting application input data to the server. The WinStation assumes many forms such as a simple text terminal, or a personal computer (PC) emulating a terminal, or a PC running a program (or terminal) that implements the ICA protocol. The functionality of the WinStations and the method of communicating with the server may differ but the architecture shown in FIG. 4 accommodates these differences.

The architecture of FIG. 4 is defined if terms of the protocol layers and their specific responsibilities. At the top of both Application server 200 and WinStation 100 are the respective data sources 210 and 110. In the case of unit 110, a display screen, keyboard, and mouse are shown and function as both a data destination and data source. As previously mentioned, the WinStation 100 may take on a variety of configurations depending on the user needs. The protocol layers are defined as follows.

WinStation Driver (WD) 10 is responsible for interpreting the data stream generated by the WinStation or Application Server. The WD is tailored to each WinStation: it is different for each type of workstation (e.g. a dumb terminal or an ICA terminal).

Protocol Driver (PD) 20 is a communications layer added to the protocol stack for preparing the data to be transmitted to the corresponding WinStation or Application Server. Because all PDs support the same interfaces, each PD can be inserted or removed from the stack in accordance with the needs of each connection. The order in which the PDs are stacked is controlled by the configuration process.

Transport Driver (TD) is a PD for interfacing the stack to the system provided transport service 300 and is tailored to the type of transport service being used by each WinStation.

Protocol Advertiser (PA) 50 is used by each Application Server for broadcasting that a particular Application Server is on-line and functioning. In this way, a WinStation, using the same transport service, may be made aware its availability.

Protocol Listener (PL) 40 provides an Application Server with the capability to listen for connection requests from WinStations.

Name Resolver (NR) 30 is unique to the type of network to which the WinStation is connected, provides network name-to-address translation.

Name Enumerator (NE) 31 is unique to the type of network to which the WinStation is connected and enumerates all of the on-line Application Servers on the network.

Virtual Driver (VD) 60 is for running the virtual channel protocols as defined in the ICA. The VD supports a generic set of interfaces that are accessible through system Application Protocol Interfaces (APIs) and communicates with the WD through a special interface.

Because of some interdependencies, PDs 20 must be loaded in a specific order, e.g. the Compression PD requires the framed packets of the framing PD. The WinStation includes the following optional PDs:

(a) a Compression PD for compressing and decompressing of raw data;
(b) a Reliable PD for error handling for unreliable transports such as IPX and Async;
(c) a Framing PD for framing of stream type data from Async and TCP transport services into packets;
(d) a Modem PD for managing the establishment of a modem connection; and
(e) an Encryption PD for encrypting data.

The WDs and PDs each provide a set of Application Program Interfaces (APIs) that includes:

(a) Load ( ) for loading and linking a driver into the protocol stack;
(b) WdUnload( )/PdUnload( ) for unlinking and unloading a driver from the protocol stack;
(c) WdOpen/PdOpen for opening and initializing a driver;
(d) WdClose/PdClose for closing a driver;
(e) WdInfo/PdInfo for querying driver information;
(f) WdPoll/PdPoll for getting status and giving control to drivers in the protocol stack;
(g) PdWrite for writing data;
(h) WdQueryInformation/PdQueryInformation for querying modem status, mouse information, last error, or statistics;
(i) WdSetInformation/PdSetInformation for connecting, disconnecting, setting and killing focus.

The Transport Drivers (TDs) are similar to the PDs, i.e. the top interfaces are the same and TD loading, linking, and polling are done in the same way. The TDs differ from the PDs because the bottom interface of each is for a specific transport service. For example, the DOS IPX TD is programmed for the Novell IPX DOS INT for reading and writing packets over the underlying IPX network.

The WinStation client includes the following TDs 20:

(a) an IPX (Internet Packet Exchange) TD is a NetWare LAN communication protocol for moving data between server and/or workstation programs running on different network nodes;
(b) an SPX (Sequenced Packet Exchange) TD is an enhanced set of commands implemented on top of IPX for creating a true transport layer interface;

(c) a TCP/IP (Transmission Control Protocol) TD is an Internet protocol suite providing reliable, full duplex, stream service.

(d) a NetBIOS (Network Basic Input/Output System) TD is an application programming interface for data exchange between a server and/or workstation programs running on different network nodes; and (e) an Async TD is the standard interface to an RS-232 type asynchronous transport service.

The TD APIs are similar to those listed for the PDs/WDs above.

Name Resolver (NR) 30 is a DLL module for providing network name-to-address translation of a selected application server to UI 111 of FIG. 7. NR 30 specific APIs include: Load( ), NrUnload( ), NrOpen( ), NrClose( ), NrInfo( ), NrPoll( ), NrNameToAddress ( ), and NrErrorLookup.

Name Enumerator (NE) 31 of FIG. 7 is a DLL module for enumerating all available application servers the network. NE 31 specific APIs include: Load( ), NeUnload( ), NeOpen( ), NeClose ( ), NeInfo ( ), NePoll ( ), and NeEnumerate( ).

Virtual Channel Driver (VD) set 60 are directly connected to ICA WD to allow application level communication to be multiplexed with the display protocol. The set of VDs support the following functions:

(a) client printer mapping for allowing a printer device on the Application Server to be redirected to a printer on the client computer;

(b) client drive mapping for redirecting drive letters on the Application Server to drive letters that exist on the client computer; and (c) Thinwire presentation protocol for operating the WD protocol as a virtual channel.

VD set 60 includes the following APIs: Load( ), VdUnload, VdOpen, VdClose( ), VdInfo( ), VdPoll( ), VdQueryInformation, and VdSetInformation( ).

Scripting 32 (FIG. 7) is an optional DLL that is an extension of UI 111 for prerecording keystrokes and responses to display screen output for automating some user operations.

Because the protocol stack is a key element in determining the performance characteristics of a workstation to application server relationship, it is highly desirable to have a method for configuring the protocol stack and adapting to changing requirements without requiring changes to existing protocol modules. Prior art implementations have resulted in static monolithic protocol stacks for each particular application that can only be modified by extensive changes to the individual modules.

The method to be described allows a client workstation to specify the protocol stack without any application server prior knowledge. The client is free to specify which features it requires and allows the application server to adapt its protocol stack to match the client's stack. Also, the architecture is extensible because new protocol levels can be added to the protocol stack by supplying the client and application server protocol modules without need for modification of any other modules.

SUMMARY OF THE INVENTION

The present invention is a method for supporting an extensibly and dynamically bindable protocol stack in a distributed process system in which a client workstation can specify the features required for the application without any prior application server arrangements by using existing information exchange capability between server and client. Both the application server and the client workstation, when establishing an initial connection, are initialized with the minimum set of protocol parameters that are required by the common transport connection.

The application server broadcasts a message-on the common transport after sensing a new connection by a client workstation advising that service is available. The client workstation responds to the application server by sending a message that includes a list of protocols that are required for the client workstation application in addition to the minimum protocol set required by the common transport mechanism. Consequently, both the application server and the workstation enable the additional protocols unless the application server negotiates a modified additional protocol set by changing one or more of the parameters of the workstation supplied list of protocols. If a modification is requested by the server, both the server and the workstation enable the modified additional protocols.

Because the protocol modules are bindable, this procedure provides an extensible and dynamically bindable protocol stack.

In the description that follows, it should be understood that the term "workstation" is to be interpreted in the widest sense so that it includes the range of possible devices with a variety of possible user interfaces for inputting and displaying data as well as a variety of control, computational, and storage capacities. The workstation is meant to include such devices as: a terminal, special purpose user terminals customized to particular functions such as inventory control, and the Citrix Systems, Inc. WinStation, unless noted otherwise.

BRIEF DESCRIPTION OF THE DRAWINGS

The present invention may be more fully understood from the detailed description given below and from the accompanying drawings of the preferred embodiments of the invention, which, however, should not be taken to limit the invention to the specific embodiment but are only for explanation and understanding.

DETAILED DESCRIPTION OF THE INVENTION

Figure 4:
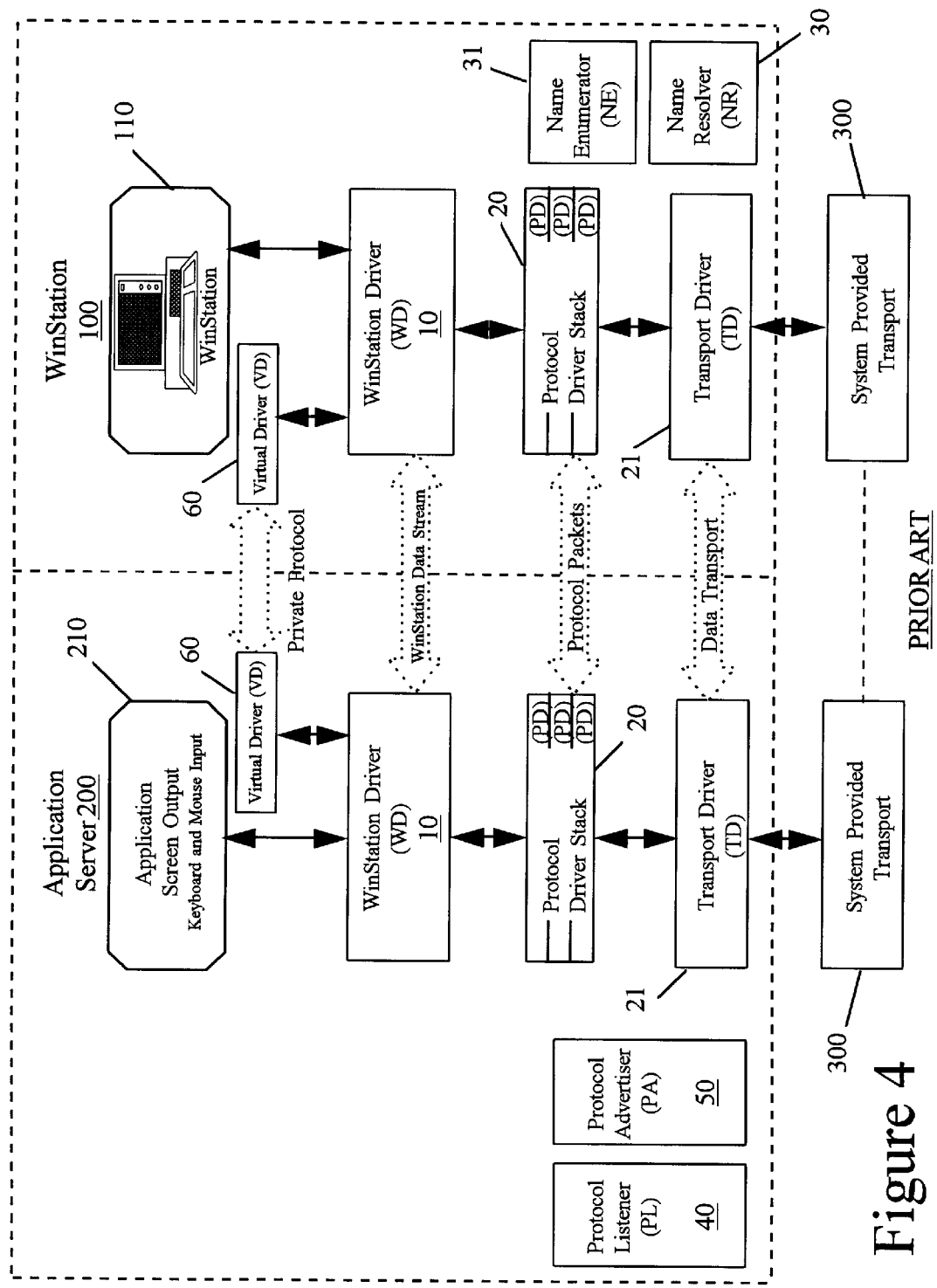
FIG. 4 shows the communication stack architecture of a commercial distributed process application server system.
Figure 5:
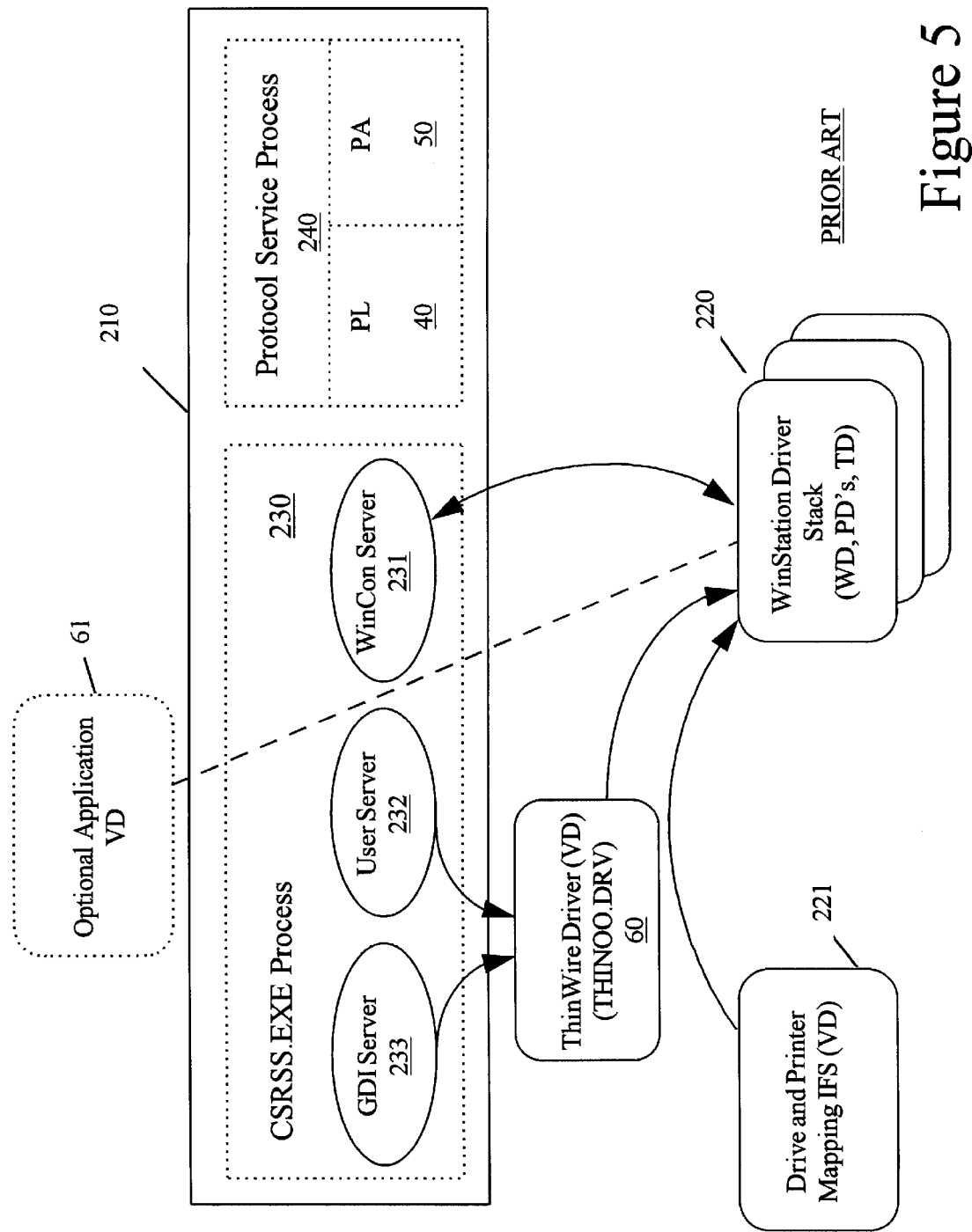
FIG. 5 shows the processes of the application server.

The Application Server 200 of FIG. 4 includes a Win32 Subsystem 210 for the management of an associated client WinStation for which application services are to be provided. As shown in FIG. 5, subsystem 210 includes the Client Server Runtime Subsystem (CSRSS.EXE) Process 230 and Protocol Service Process 240. Process (CSRSS.EXE) 230 controls WinStation Driver Stack 220, a dynamic linkable library (DLL) of protocols, through WinCon Server 231 by creating the control datastream needed to control the WinStation being accessed. WinCon Server 231 contains all the console (text window) code and APIs. WD Stack. 220 includes WD 10, PDs 20, and TD 21, each of which is a DLL driver.

ThinWire Driver 60 is controlled by Graphical Device Interface (GDI) Server 233 and User Server (USER) 232. GDI Server 233 is the graphics portion of the Win32 subsystem that contains all of the graphics code and APIs. USER 232 is the non-graphics portion of the Win32 subsystem that contains the remaining APIs not contained in WinCon Server 231 or GDI 233.

Protocol Service Process 240 controls PL 40 and PA 50 for effecting a connection between the Application Server and the WinStation requiring service. A PL 40 and PA 50 pair is provided for each type of transport that is supported by the system. The PA 50 broadcasts the Application Server's availability on a network while the PL 40 listens for service requests from WinStations on a network.

The WD interface of WD Stack 220 provides WinCon Server 231 with display function information, display mode control, and session connect/disconnect information for handling full screen text transmission and WinStation initialization. Keyboard and mouse input is delivered to WinCon Server 231 through the WD interfaces. Each WD maintains a FIFO (first-in, first-out) queue for mouse and keyboard input events. A raw input thread (RIT) in process CSRSS takes its input events from this queue.

Figure 6:
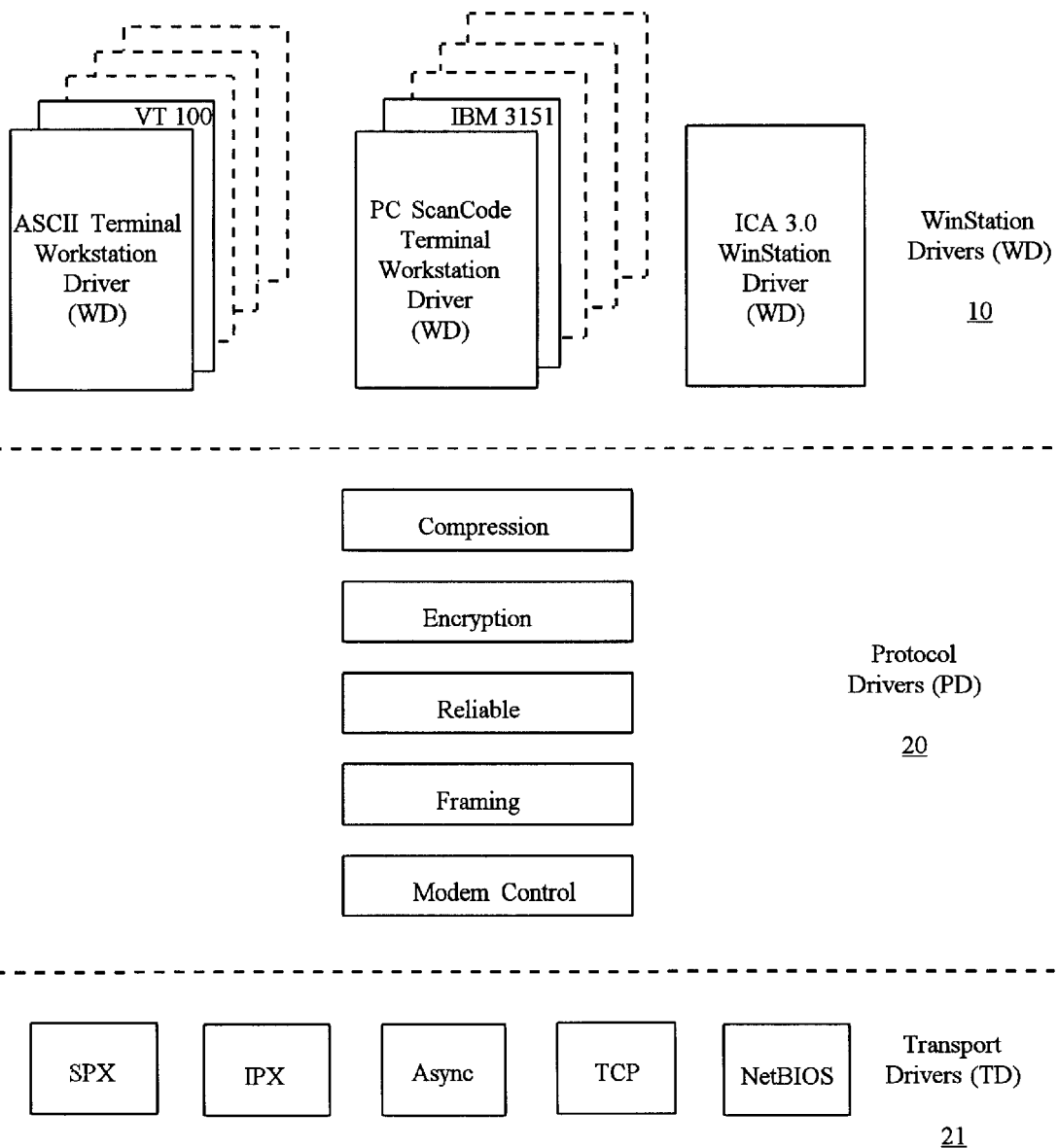
FIG. 6 shows the application server protocol stack architecture components.

The WD Stack 220 is defined by a configuration utility named WINCFG. When a WD is defined or when the Win32 Subsystem is started, the DLLs are loaded. FIG. 6 shows the Win32 Subsystem stack components. The PD 20 and TD 21 components are as previously described. The WinStation Drivers (WDs) include: ASCII terminal WD for terminals like the DEC VT420 from Digital Equipment Corp. and the Citrix ICA 3.0 WD.

Figure 7:
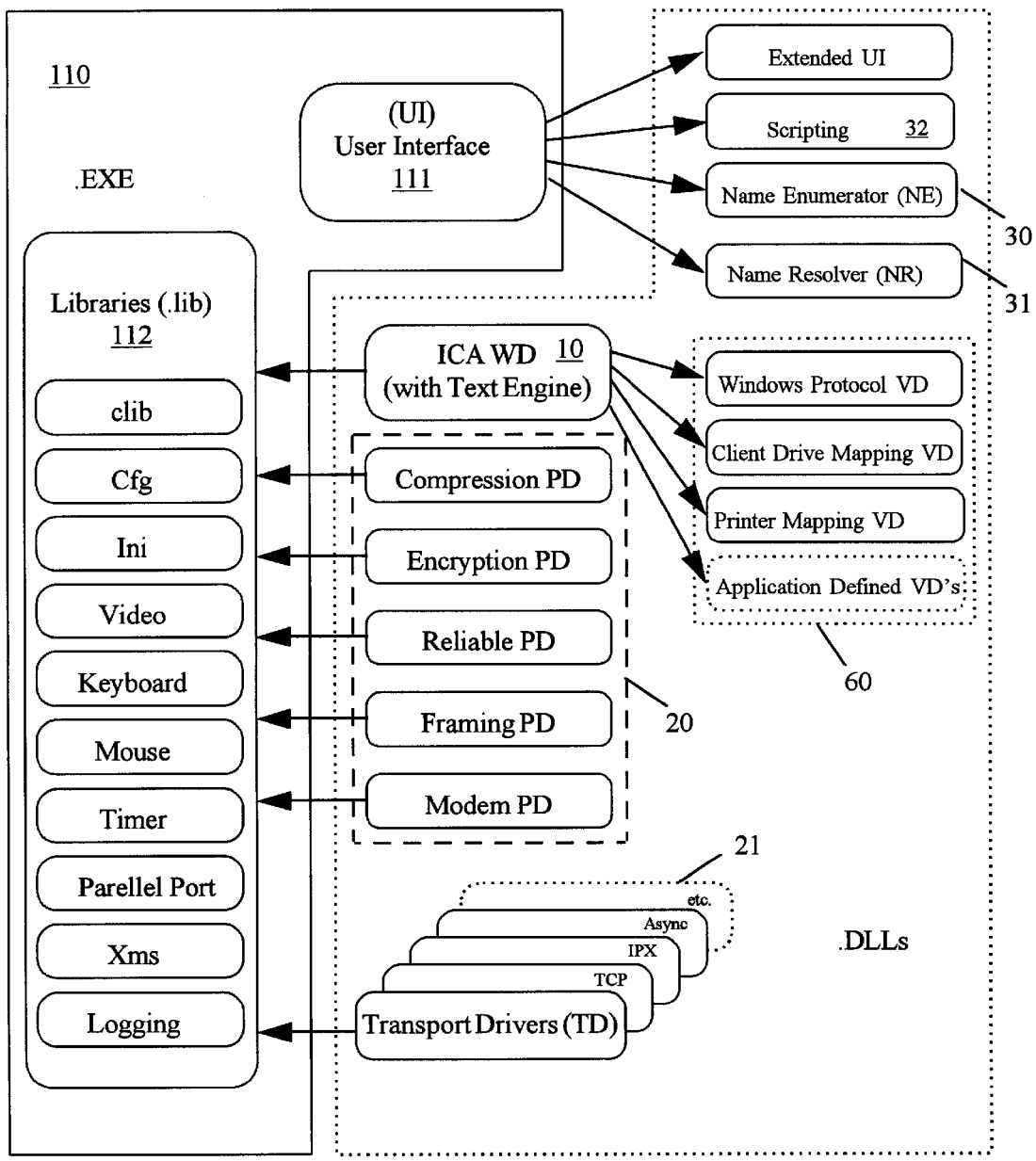
FIG. 7 is an architectural representation of an ICA type workstation.

ICA WinStation, a DOS (disc operating system) program for connecting to and communicating with the Application Server using the ICA protocol, is modular and can be dynamically configured and customized with different user interfaces and optional virtual channel capabilities. FIG. 7 is a graphical representation of ICA WinStation 110 that shows ICA WinStation 110 as an executable (.EXE) DOS program that includes User Interface (UI) 111 and Libraries (.LIB) 112 operating on an assortment of DLLs that are run-time loaded and linked. The Libraries can be linked with the User Interface and DLLs to provide system independent interfaces and ease in porting to non-DOS platforms.

UI 111 is the master controller of the ICA WinStation and has responsibility for:

(1) establishing and maintaining configuration data;
(2) loading required protocol components;
(3) running a polling loop; and
(4) presenting a local user interface.

In order to make a connection to a specific application server, UI 111 maintains configuration information for the connection that includes any name-to-address translation data and a list of protocol stack components (PDs and TD) and protocol parameters required. When an Application Server is selected by the user, the UI loads the appropriate stack components and passes the user selected parameters to the Application Server based upon the configuration data. Configuration Libraries (CFGs), based on Initialization (.INI) files, are used to simplify the loading and linking process. The connection process is initiated by a UI call to the ICA WD 10 at the top of the stack with a connection initiation command. The connection process is asynchronous. UI 111 starts its polling loop by keying off the connection status that is returned. Once the connection status is established, UI gives up focus (i.e. ownership of the keyboard, mouse, and display screen) to the WD. The UI remains the master and continues to run the polling loop. WD gives up focus when the connection is broken.

While a connection exists, UI 111 can query statistics and error conditions and, can also terminate the connection. If a connection is broken, UI 111 is responsible for cleaning-up, by unloading all of the stack components.

There are four .INI files associated with UI 111:

(1) MODULE.INI that lists the protocol stack components;
(2) APPSRV.INI that describes the application server configuration;
(3) MODEM.INI that describes the modem management strings;and
(4) WFCLIENT.INI that lists the user configurations.

Winstation Libraries 112, a set of run-time libraries that simplify customization of components, includes:

(1) clib, a C-language run-time library subset;
(2) cfg, libraries for configuration and standard operations such as loading and linking;
(3) ini, functions for access of .INI style parameters;
(4) video, keyboard, mouse, timer, and parallel port libraries for access to these hardware components;
(5) xms, extended memory allocation libraries; and
(6) logging, functions for standard logging and tracing facilities.

These libraries are directly linked to by the UI EXE and are accessible to the DLLs indirectly through the DLL interface process.

ICA WD 10, when it has focus, controls the presentation of a specific WinStation protocol on the local screen display and also manages the communication of the keyboard and mouse inputs to the Application Server. Focus is given to ICA WD by UI 111, as previously described.

ICA WD 10 gets its protocol packets from the topmost PD on PD stack 20. When ICA WD 10 links with this PD, it registers an input processing entry point. This entry point is called when a data packet is available. When ICA WD 10 needs to write data, it calls the PD using a PD write function.

ICA WD 10 also responds to the polling function of UI 111 and passes it on to lower stack layers. State data is reported by this method so that, for example, if a lower layer detects that a connection is broken, this status information is passed up to UI 111 through the return codes of the polling functions.

ICA WD 10 also provides a general purpose virtual channel capability represented by the set of virtual channel drivers (VDs) 60 described below.

ICA WD 10 provides a set of Application Program Interfaces (APIS) that includes:

(a) Load( ) for loading and linking a driver into the protocol stack;
(b) WdUnload( ) for unlinking and unloading a driver from the protocol stack;
(c) WdOpen for opening and initializing a driver;
(d) WdClose for closing a driver;
(e) WdInfo for querying driver information;
(f) WdPoll for getting status and giving control to drivers in the protocol stack;

(g) WdQueryInformation for querying modem status, mouse information, last error, and statistics; and (h) WdSetInformation for connecting, disconnecting, setting or killing a focus.

All protocol drivers (PDs) 20 have the same interfaces and are dynamically loaded and linked in the same manner by UI 111. Also, a PD may be added or removed from the configuration without changing the underlying code.

Figure 8:
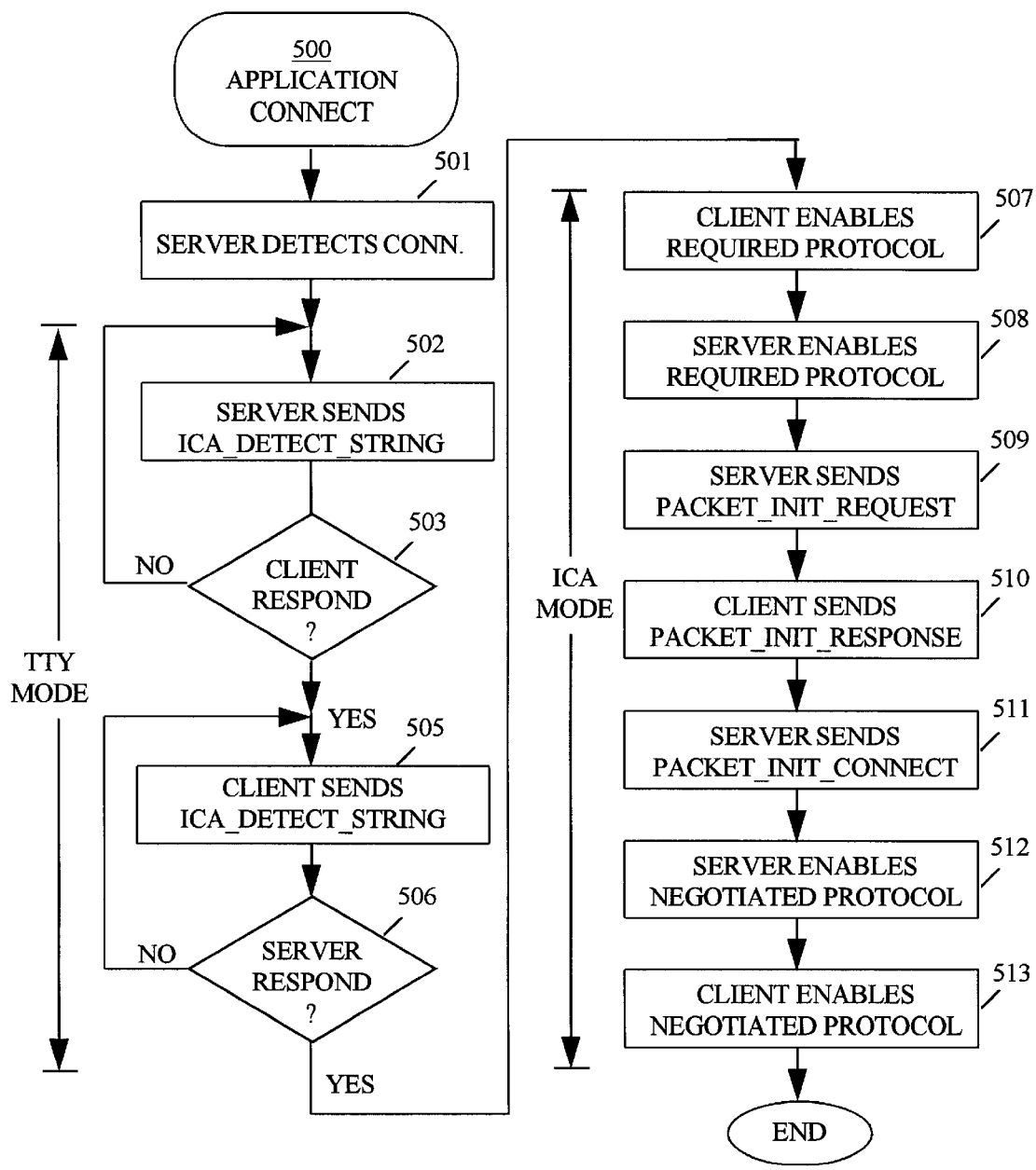
FIG. 8 is a flow diagram for implementing an extensible and dynamically bindable protocol stack.

FIG. 8 is a flow diagram depicting the process by which an extensible and dynamically bindable protocol stack 20 is established. This process allows a client workstation to specify the contents of a protocol stack dynamically without requiring that application server have a prior protocol stack description for a particular workstation and a particular application requirement.

Application Connect process 500 of FIG. 8 begins with the assumption that an application server 200 is on-line and monitoring activity on a specific transport system (e.g. LAN or WAN) and has initialized its protocol stack with the minimal necessary protocol modules to support a "TTY" communication mode. This mode is a raw ASCII stream mode with no protocol assumptions above the transport layer (i.e. there are no protocol layers for compression, encryption, reliability, framing, or modem). Similarly, a workstation seeking application service establishes a connection to the common transport system with the minimum protocol set needed to support a TTY communication mode.

Upon detecting that a workstation has established transport system connection (step 501), the application server broadcasts a TTY data stream, "ICA_DETECT_STRING", in step 502 that indicates service is available. The method used for detecting a workstation connection is transport system dependent (e.g. in the case of the TCP transport, when a client connects to a known port). If the client workstation does not respond within a prescribed time period (e.g. 5 seconds), step 503 a re-broadcast of mission of the message in step 502. Otherwise the process proceeds to step 505 where the client sends the TTY string "ICA_DETECT-STRING". In step 506, the client waits for the server to respond and, if the response is within a prescribed time interval (e.g. 5 seconds), the process proceeds to steps 507 where the client enables the required protocol for supporting its application. Otherwise, the client repeats the transmission of the message in step 505. The server responds in step 508 by enabling the required set of protocols. At step 509, the TTY mode of communication ends because the next message sent by the server is an ICA protocol packet, "PACKET_INIT_REQUEST", which indicates that the client's required "ICA_DETECT_STRING" has been received and accepted. In response to step 509, the client, at step 510, sends a set of ICA protocol packets, "PACKET_INIT_RESPONSE", each of which is used to specify a required or optional protocol module that is being negotiated with the server. At step 511, the server sends a set of "PACKET_INIT_CONNECT" packets. The number of packets is variable: one for each client packet sent in step 510, thus giving the server the opportunity to negotiate the parameters under which communications will take place by overriding the clients parameters; or, the server may indicate that all of the clients parameters are acceptable by sending the client's parameters unchanged. At step 512 the server enables the negotiated protocols (including any optional protocols) of step 511. After the client receives the packets from step 511, the client enables the negotiated protocols in step 513.

The messages used in Application Connect process 500 of FIG. 8 are defined below using a hexadecimal format for numerical values (0xXX, a two digit byte in which X is a hexadecimal number).

Figure 1:
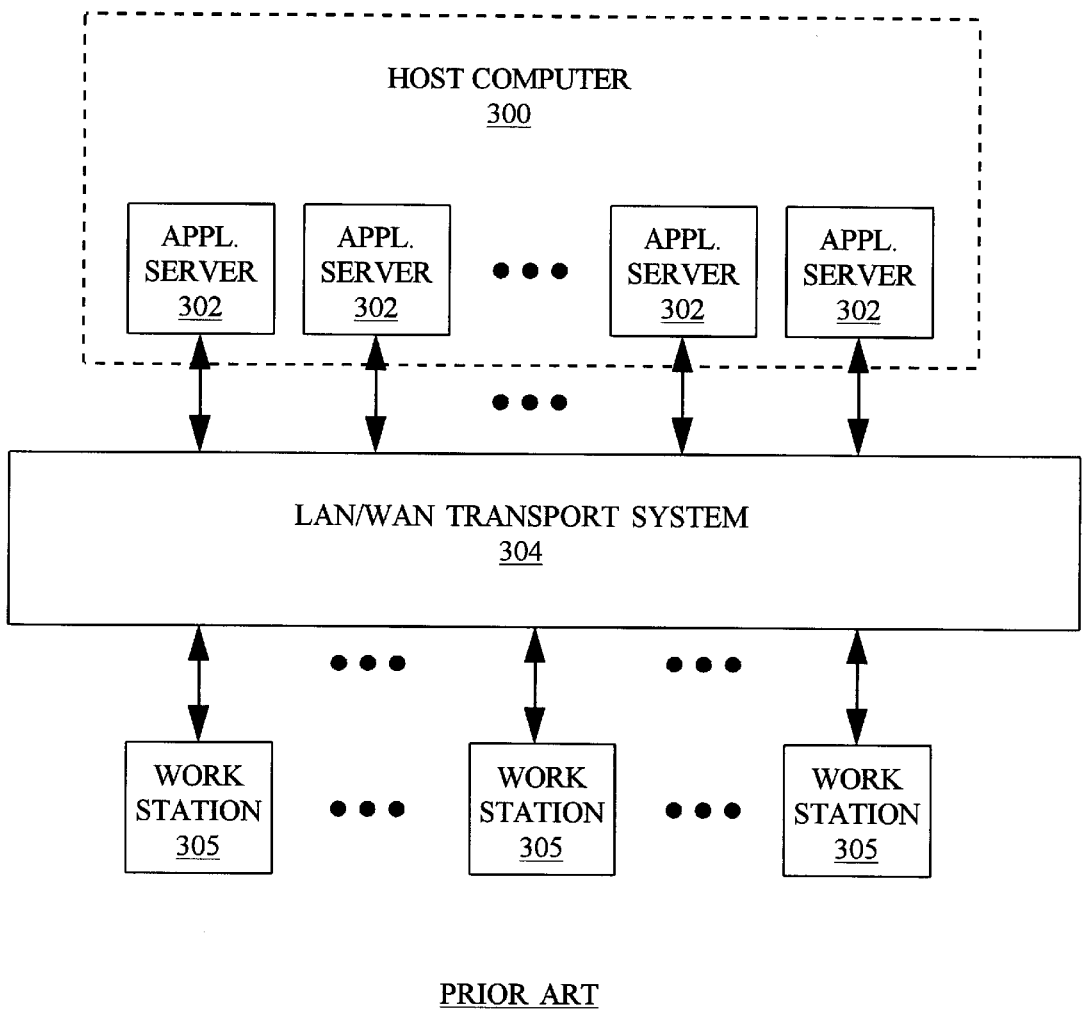
FIG. 1 shows a distributed application presentation system.
Figure 2:
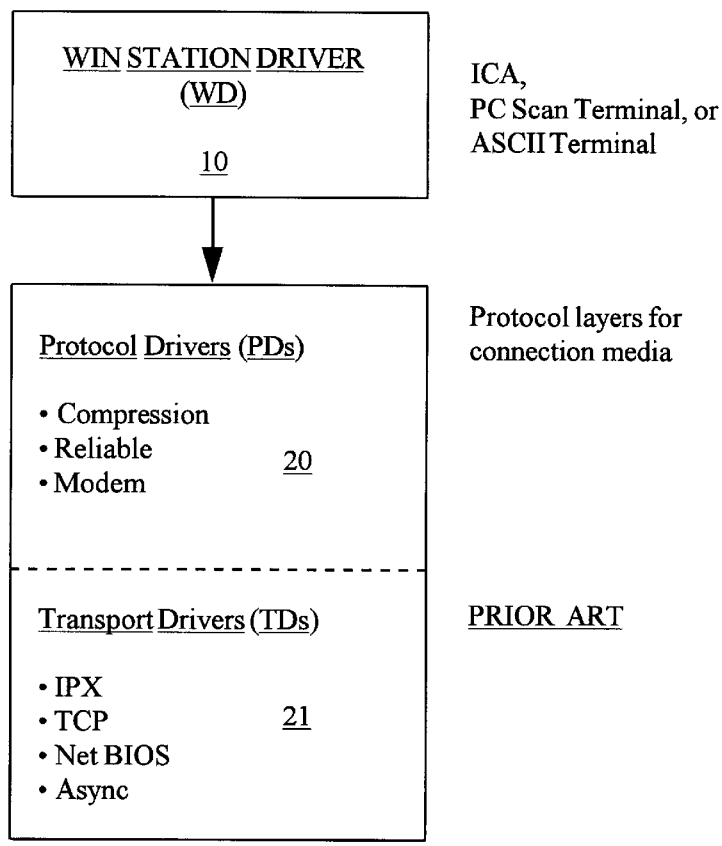
FIG. 2 shows the major workstation protocol layers of a distributed process application server system.
Figure 3:
FIG. 3 shows a communication packet format used in the distributed process system.

ICA_DETECT_STRING: 0x7f 0x7f I C A 0x00, an ASCII string; The ICA packets are defined with reference to the packet format shown in FIG. 3 in which the following symbols are used: C1 is the COMMAND byte; and Pk (k=1,2, . . . ,k, . . . ) is the kth COMMAND DATA byte.

PACKET_INIT_REQUEST:

C1—0x00,

PI, P2—low and high bytes of COMMAND DATA byte count,respectively.

PACKET_INIT_RESPONSE:

C1—0x01,

PI, P2—low and high bytes of COMMAND DATA byte count, respectively,

P3 . . . Pn—module description (e.g. module byte count, module count, module class (UI, WD, VD, PD, or TD), module name, module date and time, module file size, host name, and ICA versions supported).

PACKET_INIT_CONNECT:

C1—0x02,

PI, P2—low and high bytes of COMMAND DATA byte count, respectively.

P3 . . . Pn—module description as in PACKET_INIT_RE-SPONSE above.

As will be understood by those skilled in the art, many changes in the apparatus and methods described may be made by the skilled practitioner without departing from the spirit and scope of the invention, which should be limited only as set forth in the claims which follow.

What is claimed is:

1. A method for providing an extensible and dynamically bindable protocol stack in an application server based on an information exchange between the application server and one of a plurality of client workstations, both the application server and the client workstations initialized with a prescribed set of enabled protocols and associated protocol parameters providing a common transport mechanism, the method comprising:

(a) the application server transmitting a request protocol message to one of a plurality client workstations;

(b) the client workstation responding to the request protocol message with a plurality of client protocol packets specifying one or more additional protocols and associated protocol parameters that are desired by the client workstation for a client workstation application;

(c) the application server responding to each protocol packet transmitted by the client workstation with a server protocol packet counter-specifying one or more associated protocol parameters; and (d) the application server and the client workstation each enabling the additional protocols with the negotiated protocol parameters in preparation for running the client workstation application.

2. The method of claim 1 wherein step (d) further comprises the application server sending an acknowledgment message to the client workstation indicating that the additional protocols have been enabled.

3. The method of claim 1 wherein step (c) further comprises the application server responding to each protocol packet transmitted by the client workstation with a server protocol packet, at least one of the server protocol packets modifying at least one of the associated protocol parameters.

4. The method of claim 1 wherein step (a) further comprises:

(a-a) the application server broadcasting a service available message on the common transport mechanism;

(a-b) one of the plurality of client workstations sending, on the common transport mechanism, a response to the server's service available message;

(a-c) the application server and the responding client workstation each enabling a required set of communication protocols for further communication between the application server and the client workstation; and (a-d) the application server transmitting a request protocol message, via the enabled communication protocol, to the responding client workstation.

5. The method of claim 4 further comprising after step (a-a) the step of the application server rebroadcasting a service available message to the client workstations if no client workstation sends a response to the application server's service available message within a predetermined period of time.

6. The method of claim 4 further comprising after step (a-b) the step of the server acknowledging the client workstation's response to the service available message.

7. The method of claim 6 further comprising the step of one of the client workstations resending on the common transport mechanism a response to the server's service available message if the server does not acknowledge the client workstation's response within a predetermined period of time.

8. The method of claim 1 wherein step (c) comprises the application server responding to each protocol packet transmitted by the client workstation with a server protocol packet indicating acceptance or denial of an additional protocol specified by the client workstation.

9. A distributed process system comprising an application server, at least one client workstation, and a common transport mechanism for interconnecting the application server and the client workstation, the distributed process system providing an extensible and dynamically bindable protocol stack in the application server based on a method using information exchange between the application server and the client workstation, the method comprising:

(a) initializing the application server and the client workstation with a prescribed set of enabled protocols and associated protocol parameters providing a common transport mechanism;

(b) the application server transmitting a request protocol message to the client workstation;

(c) the client workstation responding to the request protocol message with a plurality of client protocol packets specifying one or more additional protocols and associated protocol parameters that are desired by the client workstation for a client workstation application;

(d) the application server responding to each protocol packet transmitted by the client workstation with a server protocol packet counter-specifying one or more associated protocol parameters; and (e) the application server and the client workstation each enabling the additional protocols with the negotiated protocol parameters in preparation for running the client workstation application.

10. The system of claim 9 wherein method step (e) further comprises the application server sending an acknowledgment message to the client workstation indicating that the additional protocols have been enabled.

11. The system of claim 9 wherein method step (d) further comprises the application server responding to each protocol packet transmitted by the client workstation with a server protocol packet, at least one of the server protocol packets modifying at least one of the associated protocol parameters.

12. The method of claim 9 wherein step (b) further comprises:

(b-a) the application server broadcasting a service available message on the common transport mechanism;

(b-b) the client workstation sending, on the common transport mechanism, a response to the server's service available message;

(b-c) the application server and the responding client workstation each enabling a required set of communication protocols for further communication between the application server and the client workstation; and (b-d) the application server transmitting a request protocol message, via the enabled communication protocol, to the responding client workstation.

13. The method of claim 12 further comprising after step (b-a) the step of the application server rebroadcasting a service available message on the common transport mechanism if no client workstation sends a response to the application server's service available message within a predetermined period of time.

14. The method of claim 12 further comprising after step (b-b) the step of the server acknowledging the client workstation's response to the service available message.

15. The method of claim 14 further comprising the step of the client workstation resending on the common transport mechanism a response to the server's service available message if the server does not acknowledge the client workstation's response within a predetermined period of time.

16. The method of claim 9 wherein step (d) comprises the application server responding to each protocol packet transmitted by the client workstation with a server protocol packet indicating acceptance or denial of an additional protocol specified by the client workstation.

17. The method of claim 9 wherein step (a) comprises initializing the application server and the client workstation with a prescribed set of enabled protocols and associated protocol parameters providing a common transport mechanism, wherein the common transport mechanism comprises raw ASCII stream mode of communications.

18. A server method for providing an extensible and dynamically bindable protocol stack for a client workstation, the server initialized with a prescribed set of enabled protocols and associated protocol parameters providing a common transport mechanism, the server method comprising:

(a) transmitting a request protocol message to a client workstation;

(b) receiving a plurality of client protocol packets from the client workstation, each of the received protocol packets specifying one or more additional protocols and associated protocol parameters that are desired by the client workstation;

(c) responding to each received client protocol packets by transmitting a server protocol packet counter-specifying one or more associated protocol parameters; and (d) enabling the additional protocols with the negotiated protocol parameters in preparation for serving the client workstation.

19. The method of claim 18 wherein step (d) further comprises sending an acknowledgment message to the client workstation indicating that the additional, negotiated protocols have been enabled.

20. The method of claim 18 further comprising after step (a) the step of rebroadcasting a service available message if no client workstation responds in a predetermined period of time.

21. The method of claim 18 wherein step (a) further comprises:
  (a-a) broadcasting a service available message on the common transport mechanism;
  (a-b) receiving a response from a client workstation on the common transport mechanism;
  (a-c) enabling a required set of communication protocols for further communication with the client workstation; and
  (a-d) transmitting a request protocol message to the responding client workstation via the enabled communication protocol.

* * * * *

UNITED STATES PATENT AND TRADEMARK OFFICE
CERTIFICATE OF CORRECTION

PATENT NO. : 5,826,027
DATED : October 20, 1998
INVENTOR(S) : Pedersen et al.

It is certified that error appears in the above-identified patent and that said Letters Patent is hereby corrected as shown below:

On the title page, item [54],

<u>In the Title</u>

Replace "DISTRUBITED" with "DISTRIBUTED"

Col 1, line 4, replace "DISTRUBITED" with "DISTRIBUTED"

Signed and Sealed this

Fifth Day of January, 1999

Attest:

Attesting Officer

*Acting Commissioner of Patents and Trademarks*